US009240051B2

(12) United States Patent
Liu et al.

(10) Patent No.: US 9,240,051 B2
(45) Date of Patent: Jan. 19, 2016

(54) OBJECT DENSITY ESTIMATION IN VIDEO (75) Inventors: Haiying Liu, Chantilly, VA (US); Peter L. Venetianer, McLean, VA (US); Niels Haering, Reston, VA (US); Omar Javed, Herndon, VA (US); Alan J. Lipton, Herndon, VA (US); Andrew Martone, Reston, VA (US); Zeeshan Rasheed, Reston, VA (US); Weihong Yin, Herndon, VA (US); Li Yu, Herndon, VA (US); Zhong Zhang, Herndon, VA (US)

(73) Assignee: Avigilon Fortress Corporation, Vancouver (CA)

( * ) Notice: Subject to any disclaimer, the term of this patent is extended or adjusted under 35 U.S.C. 154(b) by 1696 days.

(21) Appl. No.: 11/602,490

(22) Filed: Nov. 21, 2006

(65) Prior Publication Data
US 2008/0106599 A1 May 8, 2008

Related U.S. Application Data (60) Provisional application No. 60/739,013, filed on Nov. 23, 2005.

(51) Int. Cl.
*H04N 7/18* (2006.01)
*G06T 7/20* (2006.01)
*G06K 9/00* (2006.01)
*G06K 9/32* (2006.01)

(52) U.S. Cl.
CPC .......... *G06T 7/2033* (2013.01); *G06K 9/00362* (2013.01); *G06K 9/00778* (2013.01); *G06K 9/3241* (2013.01); *G06T 2207/30241* (2013.01)

(58) Field of Classification Search
CPC .................. G06K 9/00778; G06T 7/2033
USPC ........................................................ 348/154
See application file for complete search history.

(56) References Cited

U.S. PATENT DOCUMENTS

| 3,812,287 A | 5/1974 | Lemelson |
| 4,442,544 A * | 4/1984 | Moreland et al. ............. 382/273 |
| 5,448,315 A | 9/1995 | Soohoo |
| 5,491,511 A | 2/1996 | Odle |
| 5,610,653 A | 3/1997 | Abecassis |
| 5,623,249 A | 4/1997 | Camire |

(Continued)

FOREIGN PATENT DOCUMENTS

| JP | 10290449 A | 10/1998 |
| WO | WO2005/039181 | * 4/2005 |
| WO | PCT/US06/45068 | 10/2007 |

OTHER PUBLICATIONS

Jemez Technology Corp., Variant iD Web-Site, www.variantid com, printed Aug. 25, 2003.

(Continued)

*Primary Examiner* — Kevin Mai
(74) *Attorney, Agent, or Firm* — MH2 Technology Law Group, LLP (57) ABSTRACT

A video camera may overlook a monitored area from any feasible position. An object flow estimation module monitor the moving direction of the objects in the monitored area. It may separate the consistently moving objects from the other objects. A object count estimation module may compute the object density (e.g. crowd). A object density classification module may classify the density into customizable categories.

19 Claims, 9 Drawing Sheets

(56) References Cited

U.S. PATENT DOCUMENTS

| | | | |
|---|---|---|---|
| 5,696,503 | A | 12/1997 | Nasburg |
| 5,801,943 | A | 9/1998 | Nasburg |
| 5,860,086 | A | 1/1999 | Crump et al. |
| 5,886,701 | A | 3/1999 | Chauvin et al. |
| 5,956,081 | A | 9/1999 | Katz et al. |
| 5,959,690 | A | 9/1999 | Toebes, VIII et al. |
| 5,987,211 | A | 11/1999 | Abecassis |
| 5,999,189 | A | 12/1999 | Kajiya et al. |
| 6,014,461 | A | 1/2000 | Hennessey et al. |
| 6,075,560 | A | 6/2000 | Katz |
| 6,091,771 | A | 7/2000 | Seeley et al. |
| 6,097,429 | A | 8/2000 | Seeley et al. |
| 6,144,375 | A | 11/2000 | Jain et al. |
| 6,177,886 | B1 | 1/2001 | Billington et al. |
| 6,201,473 | B1 | 3/2001 | Schaffer |
| 6,226,388 | B1 | 5/2001 | Qian et al. |
| 6,696,945 | B1 | 2/2004 | Venetianer et al. |
| 2002/0025073 | A1 | 2/2002 | Shibuya |
| 2002/0122570 | A1* | 9/2002 | Paragios et al. ............... 382/103 |
| 2003/0174773 | A1 | 9/2003 | Comaniciu et al. |
| 2003/0235327 | A1 | 12/2003 | Srinivasa |
| 2004/0240542 | A1* | 12/2004 | Yeredor et al. ........... 375/240.01 |
| 2006/0171594 | A1* | 8/2006 | Avidan et al. .................. 382/224 |
| 2008/0130948 | A1* | 6/2008 | Ozer ............................. 382/103 |

OTHER PUBLICATIONS

L. Wixson et al., "Detecting Salient Motion by Accumulating Directionally-Consistent Flow," IEEE, 1999.

W.E.L. Grimson et al., "Using Adaptive Tracking to Classify and Monitor Activities in a Site," CVRP, pp. 22-29, Jun. 1998.

A.J. Lipton et al., "Moving Target Classification and Tracking from Real-Time Video," IUW, pp. 129-136, 1998.

T.J. Olsen et al., "Moving Object Detection and Event Recognition Algorithm for Smart Cameras," IUW, pp. 159-175, May 1997.

A.J. Lipton et al., "Local Application of Optical Flow to Analyse Rigid Versus Non-Rigid Motion," International Conference on Computer Vision Frame Rate Workshop, Corfu, Greece, Sep. 1999.

F. Bartolini et al., "Counting people getting in and out of a bus by real-time image-sequence processing," IVC, 12(1):36-41, Jan. 1994.

M. Rossi et at., "Tracking and counting moving people," IVIP94, pp. 212-216, 1994.

C.R. Wren et al., "Pfinder: Real-time tracking of the human body," Vismod, 1995.

L. Khoudour et al., "Real-time Pedestrian Counting by Active Linear Cameras," JEI, 5(4):452-459, Oct. 1996.

S. Ioffe et al., "Probablistic Methods for Finding People," IJCV, 43(1):45-68, Jun. 2001.

Isard et al., "BraMBELe: A Bayesian Multiple-Blob Tracker," ICCV, 2001.

D.M. Gavrila, "The Visual Analysis of Human Movemove: A Survey." CVIU, 73(1):82-98, Jan. 1999.

H. Naering et al., "Visual Event Detection,"Video Computing Series, Editor Mubarak Shah, 2001.

Collins et al., "A System for Video Surveillance and Monitoring: VSAM Final Report," Technical Report CMU-RI-TR-00-12, Robotics Institute, Carnegie Mellon University, May 2000.

J.P. Deparis et al., "A Device for Counting Passengers Making Use of Two Active Linear Cameras: Comparison of Algorithms," IEEE, pp. 1629-1634, 1996.

C.R. Wren et al., "Pfinder: Real-Time Tracking of the Human Body," PAMI, vol. 19, pp. 780-784, 1997.

M. Allmen et al., "Long-Range Spatiotemporal Motion Understanding Using Spatiotemporal Flow Curves," Proc. IEEE CVPR, Lahaina, Maui, Hawaii, pp. 303-309, 1991.

L. Wixson, "Detecting Salient Motion by Accumulating Directionally Consistent Flow", IEEE Trans. Pattern Anal. Mach. Intell., vol. 22, pp. 774-781, Aug. 2000.

A.J. Lipton "Virtual Postman-An Illustrative Example of Virtual Video," International Journal of Robotics and Automation, vol. 15, No. 1, Jan. 2000, pp. 9-16.

A.J. Lipton, "Virtual Postman-Real Time, Interactive Virtual Video," IASTED Conference on Computer Graphics and Imaging (CCIM'99), Palm Springs, Oct. 25-27, 1999.

H. Fujiyoshi et al., "Real-Time Human Motion Analysis by Image Skeletonization," Proceedings of IEEE WACV'98, Princeton, NJ, 1998, pp. 15-21.

A.J. Lipton et al., "Moving Target Classification and Tracking from Real-time Video," Proceedings of IEEE WACV'98, Princeton, NJ, 1998, pp. 8-14.

A.J. Lipton et al., "Local Application of Optic Flow to Analyse Rigid Versus Non-Rigid Motion," International Conference on Computer Vision, Corfu, Greece, Sep. 1999.

R.T. Collins et al., "Using a DEM to Determine Geospatial Object Trajectories," CMU-RI-TR98-19, 1998.

A. Selinger et al., "Classifying Moving Objects as Rigid or Non-Rigid Without Correspondences," Proceedings of DARPA Image Understanding Workshop, Nov. 1, 1998, pp. 341-47.

Chinese Office Action dated Dec. 1, 2010.

Research In Crowd Movement and Density Estimation Technology, dated Mar. 31, 2005.

Office Action in Korean Patent Application No. 10-2008-7014437, dated May 1, 2013.

\* cited by examiner

OBJECT DENSITY ESTIMATION IN VIDEO

FIELD OF THE INVENTION

The invention relates to video surveillance systems. Specifically, the invention relates to a video surveillance and verification system that may be configured to detect and track object density in video streams from any camera view.

BACKGROUND OF THE INVENTION

Video surveillance is of critical concern in many areas of life. One problem with video as a surveillance tool is that it may be very manually intensive to monitor. Recently, solutions have been proposed to the problems of automated video monitoring in the form of intelligent video surveillance systems. See, for example, U.S. Pat. No. 6,696,945, titled "Video Tripwire" and U.S. patent application Ser. No. 09/987,707, titled "Surveillance System Employing Video Primitives," both of which are incorporated herein by reference. One application of video surveillance is the detection and tracking of object (e.g. human, vehicle) density. Object density refers to the apparent density of objects within an area of a scene. For example, a very sparse crowd of people on a railway platform may constitute a low density and a very dense crowd on the same platform may constitute a high density. Unfortunately, the science of computer vision, which is behind automated video monitoring, has limitations with respect to recognizing object density, such as those in subway stations, road intersections, and other object density monitoring applications.

In a high object density scene, there are two basic limitations in current video surveillance systems. One is that the standard background subtraction used in most intelligent video surveillance applications cannot be used reliably, due to the background being occluded most of the time. The other basic limitations is that one could not properly estimate object density based on counting individual objects since the heavy occlusion and very cluttered environment causes the failure of individual object tracking.

SUMMARY OF THE INVENTION

One embodiment of the invention includes a computer-readable medium comprising software, which when executed by a computer system, causes the computer system to perform operations comprising a method to detect and track object density using a feature background model.

Another embodiment of the invention provides a computer-readable medium comprising software for video surveillance, which when executed by a computer system, causes the computer system to perform operations comprising a method of: receiving video from a video camera; detecting features in the video; estimating object count based on the features detected; computing object density based on the object count; and classifying the object density.

One embodiment of the invention includes a method to detect and track object density without a feature background model.

Another embodiment of the invention provides a method of video surveillance, comprising: estimating object flow based on video input, to obtain an estimated object flow; estimating a count of objects based on the video input, to obtain an estimated object count; and performing a classification of object density based on the estimated object count, to obtain a object density classification.

One embodiment of the invention includes a method to build a feature background model.

One embodiment of the invention includes a system to perform object density (e.g. crowd) control.

Another embodiment of the invention provides an apparatus to perform video surveillance, comprising at least one video camera; and a video surveillance system coupled to the at least one video camera. The video surveillance system includes an object flow estimation module; an object count estimation module; and an object density classification module.

BRIEF DESCRIPTION OF THE DRAWINGS

The foregoing and other features and advantages of the invention will be apparent from the following, more particular description of the embodiments of the invention, as illustrated in the accompanying drawings.

DEFINITIONS

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor or multiple processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP) or a field-programmable gate array (FPGA); a distributed computer system for processing information via computer systems linked by a network; two or more computer systems connected together via a network for transmitting or receiving information between the computer systems; and one or more apparatus and/or one or more systems that may accept data, may process data in accordance with one or more stored software programs, may generate results, and typically may include input, output, storage, arithmetic, logic, and control units.

"Software" may refer to prescribed rules to operate a computer. Examples of software may include software; code segments; instructions; computer programs; and programmed logic.

A "computer system" may refer to a system having a computer, where the computer may include a computer-readable medium embodying software to operate the computer.

A "network" may refer to a number of computers and associated devices that may be connected by communication facilities. A network may involve permanent connections such as cables or temporary connections such as those made through telephone or other communication links. Examples of a network may include: an internet, such as the Internet; an intranet; a local area network (LAN); a wide area network (WAN); and a combination of networks, such as an internet and an intranet.

"Video" may refer to motion pictures represented in analog and/or digital form. Examples of video may include television, movies, image sequences from a camera or other observer, and computer-generated image sequences. Video may be obtained from, for example, a live feed, a storage device, an IEEE 1394-based interface, a video digitizer, a computer graphics engine, or a network connection.

A "video camera" may refer to an apparatus for visual recording. Examples of a video camera may include one or more of the following: a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation of video, including, for example, compression and editing.

A "frame" may refer to a particular image or other discrete unit within a video.

DETAILED DESCRIPTION OF THE EMBODIMENTS

In describing the exemplary embodiments of the present invention illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose. Each reference cited herein is incorporated by reference.

The invention relates to a video surveillance system that may be configured to detect and track object density in video streams from a camera view. The object type may be human, vehicle, or other.

The invention may be used in a variety of applications. In a public transportation setting, the invention may be used to detect and track human crowd density in the waiting area and help crowd control and/or train/vehicle dispatch. In a traffic monitoring setting, the invention may be used to monitor vehicle flow in intersections, tunnels, bridges, etc. to control traffic lights and optimize the traffic flow. In a public area setting, the invention may be used to monitor crowd gathering and help people flow control. In a physical security setting, the invention may be used to monitor access points and optimize gate controls. In a hot spot setting, a general area of interest may be set up. If a crowd forms anywhere within the area, an alert may be generated to indicate the hot spot. This means that even if the user doesn't know where the crowd may form in the view, the system may detect local crowd hot spots. In a biological setting, the invention may be used to monitor animal (such as insect) and microorganism populations. In a medical setting, the invention may be used to monitor cell growth. In a manufacturing setting, the invention may be used to monitor and optimize work flow. In a retail setting, the invention may be used to monitor and optimize customer/inventory flow. The invention may also be used to monitor check-out areas to optimize cashier dispatching. In a fast-food setting, the invention may be used to monitor drive-through lanes to optimize food preparation. In a parking service setting, the invention may be used to monitor and optimize parking space usage. In a building management setting, the invention may be used to monitor elevators and their waiting areas to optimize elevator dispatch. In an entertainment setting, the invention may be used to monitor guest/tourist flow, say in an amusement park, to optimize facility/resource usage.

In an advertising setting, the invention may be used to evaluate human crowd density in public areas, so that the ads may be put at the most effective locations. In a city management setting, the invention may be used to monitor human/vehicle flow to forecast road/highway/lawn usage and budget the maintenance cost. In a hostile area, the invention may be used to closely monitor people gathering in sensitive area so that an alert may be generated before situation escalates. The invention may be used in virtually any scenario that requires object density information.

In an exemplary embodiment, the invention may be used to detect and track object density (e.g. crowd) on the platform of a subway station and help crowd control and/or train dispatch. For example, when a subway station platform is full of people waiting for the train, an alert may be sent to the control room to help optimize train dispatch or to close down the entrances to the station to prevent overcrowding. As another example, when the platform has few people on it, an alert may be sent to another video surveillance system to begin detecting if there is any suspicious activity, such as leaving a bag.

Figure 1:
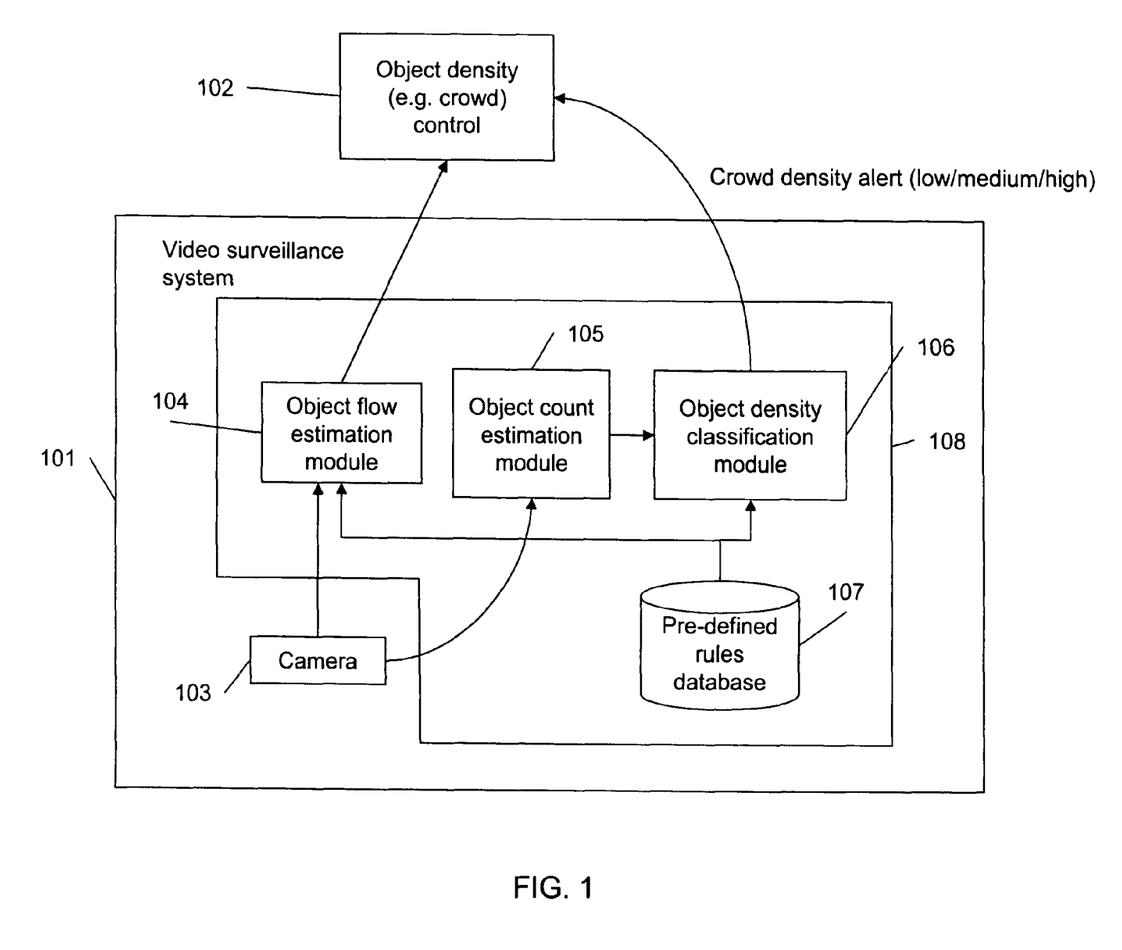
FIG. 1 illustrates a video surveillance system according to an exemplary embodiment of the invention.

FIG. 1 illustrates the video surveillance system according an exemplary embodiment of the invention. The video surveillance system 101 of the invention may interact with an object density (e.g. crowd) control system 102. The video surveillance system 101 may include a video camera 103, an object flow estimation module 104, an object count estimation module 105, an object density classification module 106, and a rule database 107.

Figure 2:
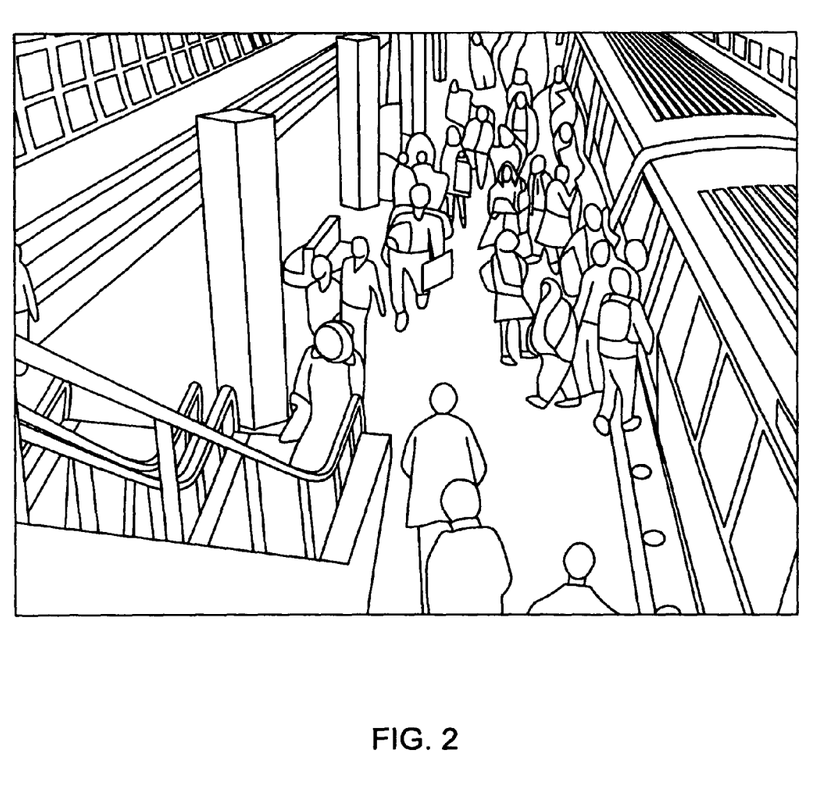
FIG. 2 illustrates an exemplary frame from a video stream from the video surveillance system according to an exemplary embodiment of the invention.

The video camera 103 may overlook the monitored area from any feasible position, e.g. it may be looking along the monitored area as illustrated in FIG. 2. The object flow estimation module 104 may monitor the moving direction of the objects in the monitored area. It may separate the consistently moving objects from the other objects. In an exemplary subway monitoring application this may allow the system to ignore the people getting on and/or off the train, thus preventing that sudden, short lived spike from corrupting the object density estimation. The object count estimation module 105 may compute the object density (e.g. crowd). The object density classification module 106 may classify the density into customizable categories. In an exemplary embodiment, the classification density categories may be low, medium, or high. If the computed object density matches the one prescribed by a rule stored in the rule database 107, then the system 101 may provide an alert to the object density (e.g. crowd) control system 102 (or some other data monitoring or archiving system) to indicate whether any action is needed.

The video camera 103 may be connected to a computer-based system (a PC, Laptop, PDA, DSP, ASIC, FPGA, microcontroller or any other form-factor processor either as a standalone device or embedded in a camera, DVR, NVR, network switcher, network router, or any other hardware device) 108 that may perform analysis of the video from the video camera 103 to determine the locations, moving direction, and density of the objects in the scene. The computer-based system 108 may include the object flow estimation module 104, the object count estimation module 105, the object density classification module 106, and the pre-defined rules database 107. The computer-based system 108 may be implemented with one or more computers employing software and connected to a network. Alternatively, the computer-based system 108 may be incorporated in whole or in part into the video camera 103. The object flow estimation module 104, object count estimation module 105, and the object density classification module 106 may be implemented as a computer-readable medium comprising software to perform the operations of the modules 104, 105, and 106, such that when the software is executed by a computer system, the computer system may be caused to perform the operations of the modules 104, 105, and 106. Alternatively, the object flow module 104, object counting module 105, the classification of object density module 106, and the pre-defined rules database 107 may be implemented with application-specific hardware to emulate a computer and/or software.

FIG. 2 illustrates an exemplary frame from a video stream from the video surveillance system according to an exemplary embodiment of the invention. The exemplary camera view may be from a video camera positioned overhead. In the exemplary frame, the camera is facing a subway station platform.

Figure 3:
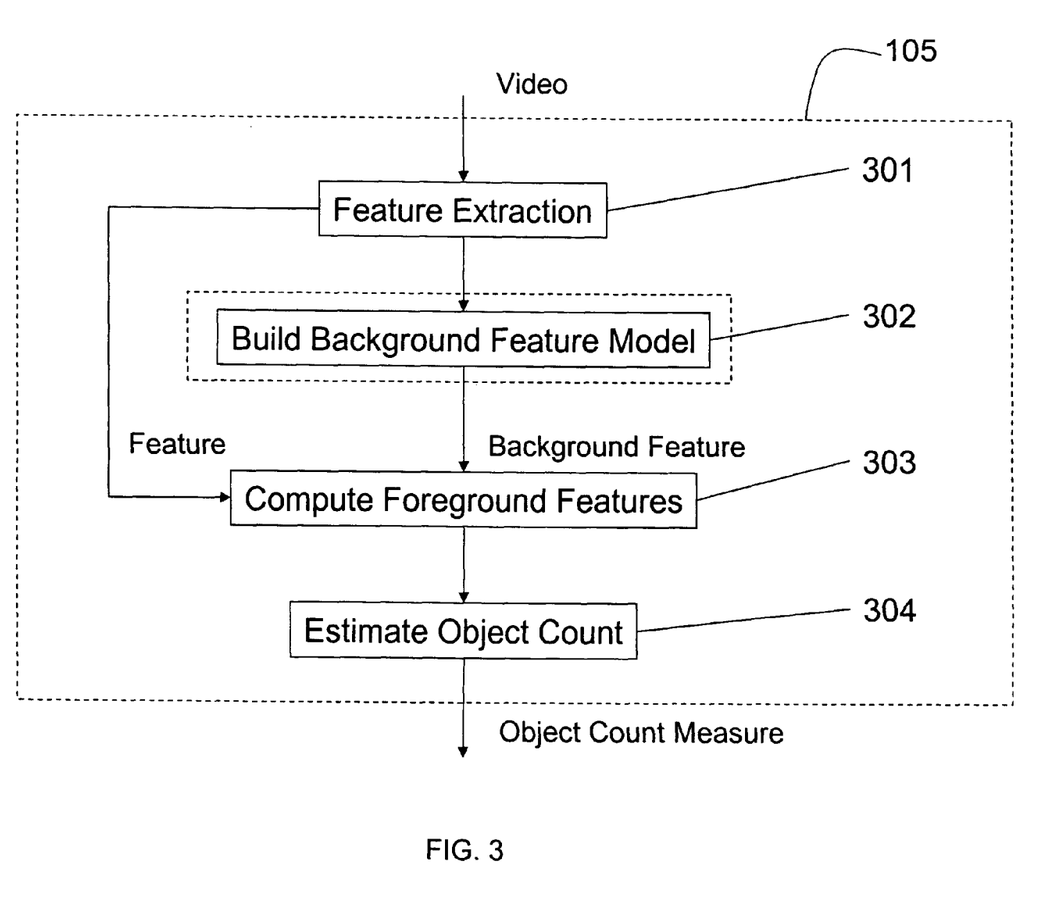
FIG. 3 illustrates a flow diagram for object count estimation according to an exemplary embodiment of the invention.

FIG. 3 illustrates a flow diagram for a process performed by object count estimation module 105 of FIG. 1 according to an exemplary embodiment of the invention. The first step may involve extracting features 301, such as edges, corners, ellipses, circles (e.g. head shape), or any other robust features extracted from the video scene. Features provide much more robust performance than object detection in case of occlusion or low visibility (e.g. at night with the car head lights). Various feature extraction methods are well known in the art, such as the Canny edge detector, the Harris corner detector, and the Hough transformation. Extracting features from the whole video frame may include static background features as well, such as those generated by e.g. steps, poles, rails. Including them during object count estimation may give incorrect results. Hence detecting the features corresponding to the background and building a background feature model 302 (described in more detail in FIG. 5) from them may help alleviate such counting problems. After building the background feature model, the foreground features may be computed 303 by removing the background features 302 from the detected features 301. This step results in the features of all the foreground objects, whether moving or not. If all the foreground objects are constantly moving, block 302 may be bypassed and foreground features 303 may be computed by simply taking the difference of features in consecutive snapshots. The foreground features may then be used to estimate object count 304. Object count estimation may be performed on the whole video frame so that the object count data may be archived (forensic storage), and activity inferencing may define arbitrary areas of interest for which to determine actual density. An exemplary embodiment of blocks 303 and 304 is discussed below in FIG. 6.

Figure 4:
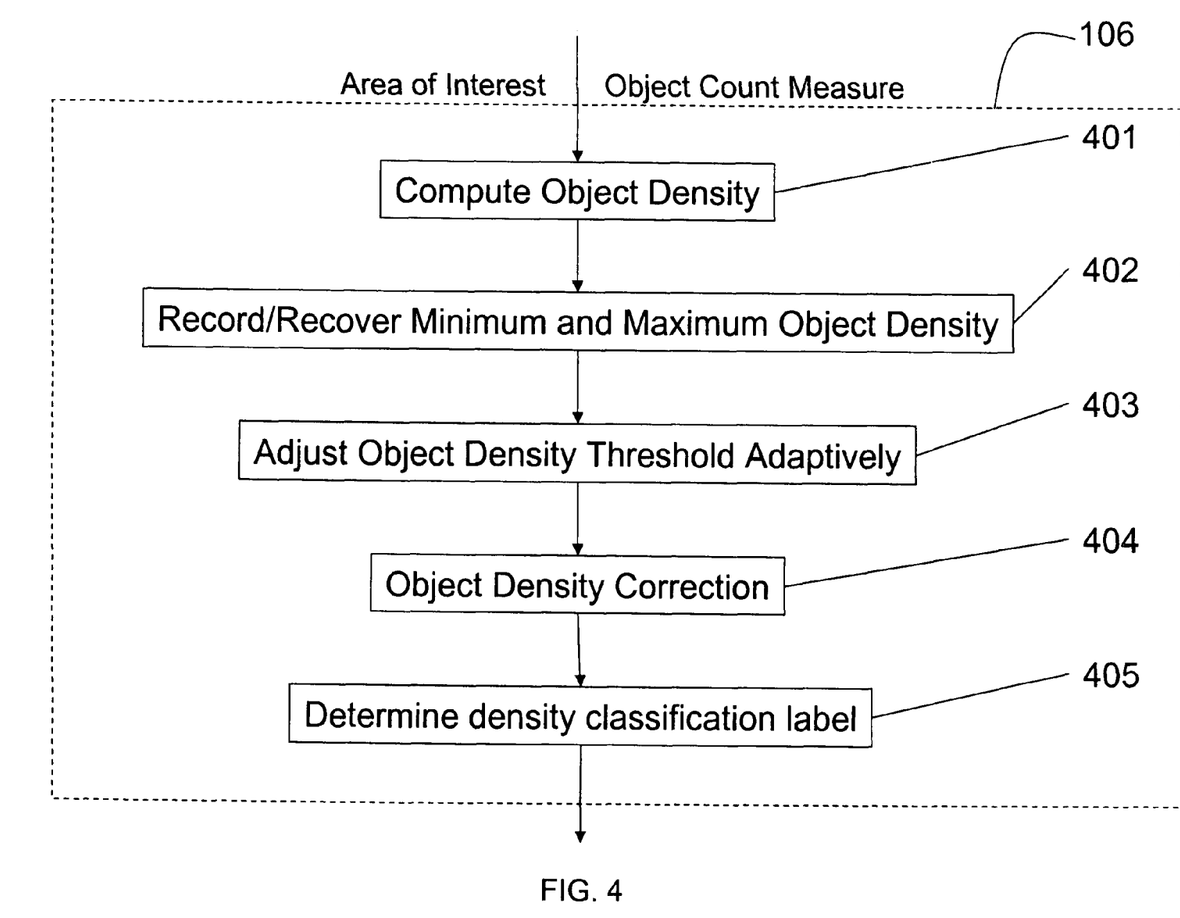
FIG. 4 illustrates a flow diagram for object density classification according to an exemplary embodiment of the invention.
Figure 7:
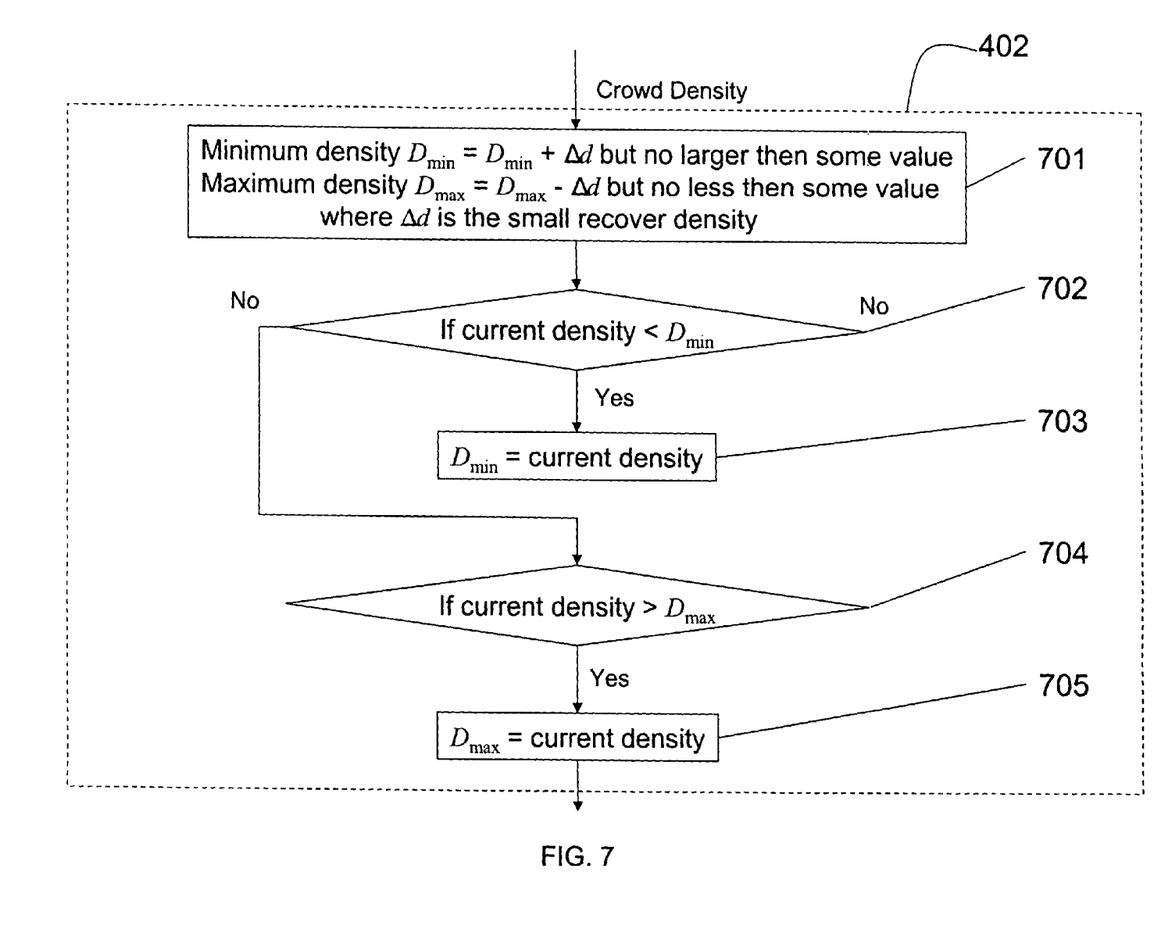
FIG. 7 illustrates a flow diagram for recording and recovering minimum and maximum object density according to an exemplary embodiment of the invention.

FIG. 4 illustrates a flow diagram for a process performed by the object density classification module in block 106 of FIG. 1 according to an exemplary embodiment of the invention. In block 401, an area of interest is defined and the object density is computed by dividing the object count estimation over the area. In block 402, the maximum and the minimum densities are continuously updated. In the real world, there may be situations that push the maximum/minimum densities to some extreme value. For example, if the camera is accidentally covered, the minimum density drops to zero; or if the camera is accidentally pointed to a high texture scene, the maximum density increases to a very high value. The purpose of updating the object density is to handle such cases. FIG. 7 described below illustrates an exemplary embodiment of the process of block 402. In block 403, thresholds may be determined dynamically. The number of thresholds and their values are based on the application and the number of required classification categories. In an exemplary embodiment with 3 classification categories (low, medium, high), two thresholds are computed to separate the 3 categories. An exemplary embodiment of determining thresholds is discussed below in FIG. 8.

Some areas may never have any traffic. Including such areas in the object count estimation may affect the accuracy of the density computation. Hence, per block 404, the object density computation may be corrected by excluding areas whose density is steadily close to zero. Finally the density classification label (e.g. low, medium, high) may be determined in block 405 by comparing the computed density to the adaptive density thresholds. The system may also learn typical densities for different days and times of days and alert for unusual densities for the specific time of the day, e.g. having a higher crowd threshold during rush hour than during other time of the day.

Figure 5:
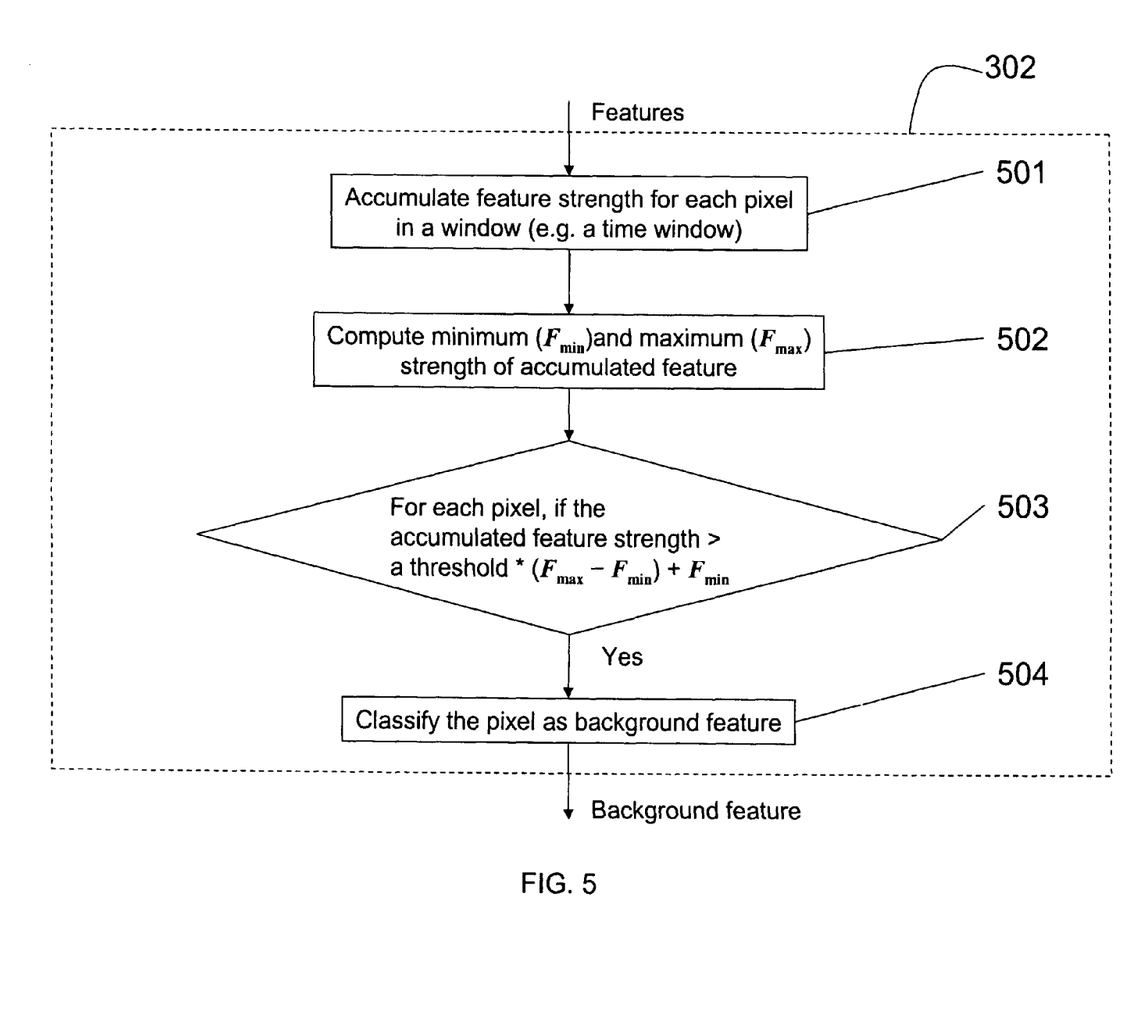
FIG. 5 illustrates a flow diagram for building a background feature model according to an exemplary embodiment of the invention.

FIG. 5 illustrates the flow diagram of an exemplary embodiment of a process for building a background feature model of block 302 in FIG. 3. The goal of this step is to determine which features are generated by static background, and which by foreground objects. In block 501, the strength of the selected feature is accumulated for each pixel within a window (e.g. a time window). For example, if edges are chosen to represent scene features, the edge strength of a pixel is increased by one each time the pixel is on an edge. Within a time window, if a pixel is on edges n times, the edge strength of the pixel is n. In block 502, the dynamic range of the accumulated feature strength may be computed as the difference between the maximum and minimum values of the accumulated feature strength over the frame. In blocks 503 and 504, those pixels whose accumulated feature strengths are larger than certain percentage of the dynamic range are labeled as background features. For example, in a frame, let the minimum feature strength be $f_{min}$ and the maximum feature strength be $f_{max}$. Set a threshold to be t, where $0 \leq t \leq 1$. If the feature strength of a pixel is larger than $(f_{max}-f_{min}) \times t + f_{min}$, the pixel is classified as a background edge pixel.

Figure 6:
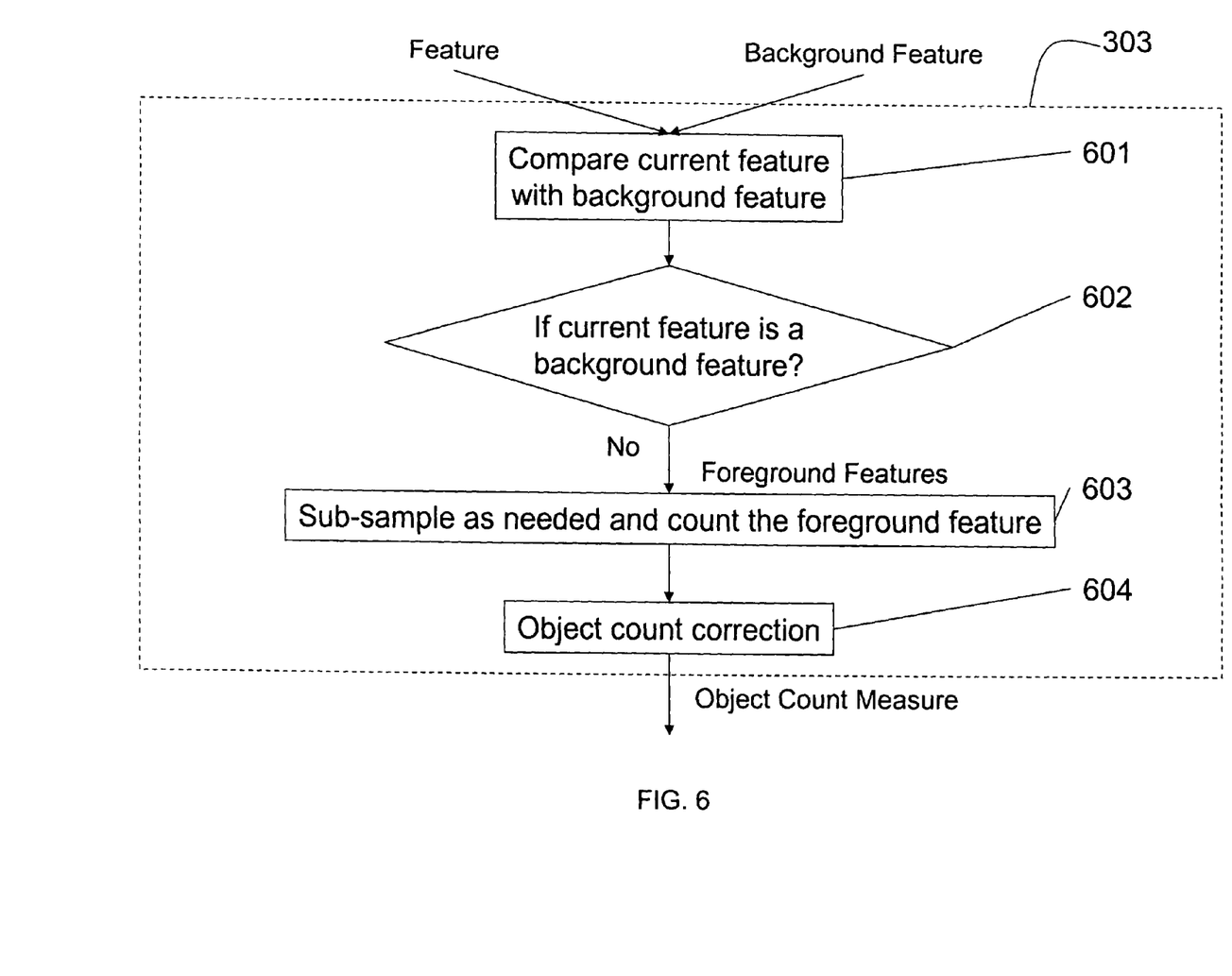
FIG. 6 illustrates a flow diagram for computing foreground features and estimating object count according to an exemplary embodiment of the invention.

FIG. 6 illustrates a flow diagram a process for computing foreground features and estimating object count in blocks 303 and 304 of FIG. 3 according to an exemplary embodiment of the invention. In block 601, features computed from a video frame are compared to the background features. In block 602, those features not included in the background features are labeled as foreground features. To speed up the process, the foreground features may optionally be sub-sampled as needed into a lower resolution in block 603, also delivering forensic storage gains. The amount of the features is a function of the object count estimation. For objects with similar texture, the object count may be proportional to the amount of features. The amount of features may then be weighted at different locations in block 604. This may be used to compensate any distortions such as camera perspective, lens distortion, etc. For example, in a camera view, an object appears to be smaller in the distance. For the same object, the amount of features tends to be less when the object is away from the camera. To compensate this, the pixels in an image frame can be weighted in a way that an object has the same or similar amount of adjusted features that are independent of distance between the object and the camera. Such compensation can be achieved using either camera calibration data if available or empirical values. The weighting may also be used to emphasize some area over others.

FIG. 7 illustrates a flow diagram of a process for recording and recovering minimum and maximum object density ($D_{min}$, $D_{max}$) in block 402 of FIG. 4 according to an exemplary embodiment of the invention. Certain extreme scenes may corrupt the computed minimum and maximum densities by making them extremely low or extremely high. While these extreme values may handle the extreme scenes correctly, it is important that over time the densities return to their normal values. In block 701, the minimum and maximum density values are slowly recovered, for example, toward some predetermined value. A recovery density may be added to and subtracted from the minimum and maximum densities, respectively. A smaller recovery density makes the algorithm more adaptive to the scene; while a larger recovery density makes the algorithm more robust to the noise. The modified maximum and minimum densities should not be decreased or increased beyond selected values. The selected values can be determined empirically by running through large amounts of normal videos and recording the maximum/minimum density values respectively. The selected values can also be determined theoretically if the feature is well defined and such theoretical maximum/minimum density values exist and are derivable. This provides a mechanism to recover these two values to their normal range after they are corrupted. In block 702 to 705, the minimum and maximum densities ($D_{min}$, $D_{max}$) are dynamically adjusted according to the scene, potentially driving the densities towards extreme values. Per block 702 and 703, it is determined if the current density is less than the minimum density $D_{min}$. If so, the current density becomes the new minimum density $D_{min}$. Per block 704 and 705, it is determined if the current density is greater than the maximum density $D_{max}$. If so, the current density becomes the new maximum density $D_{max}$.

Figure 8:
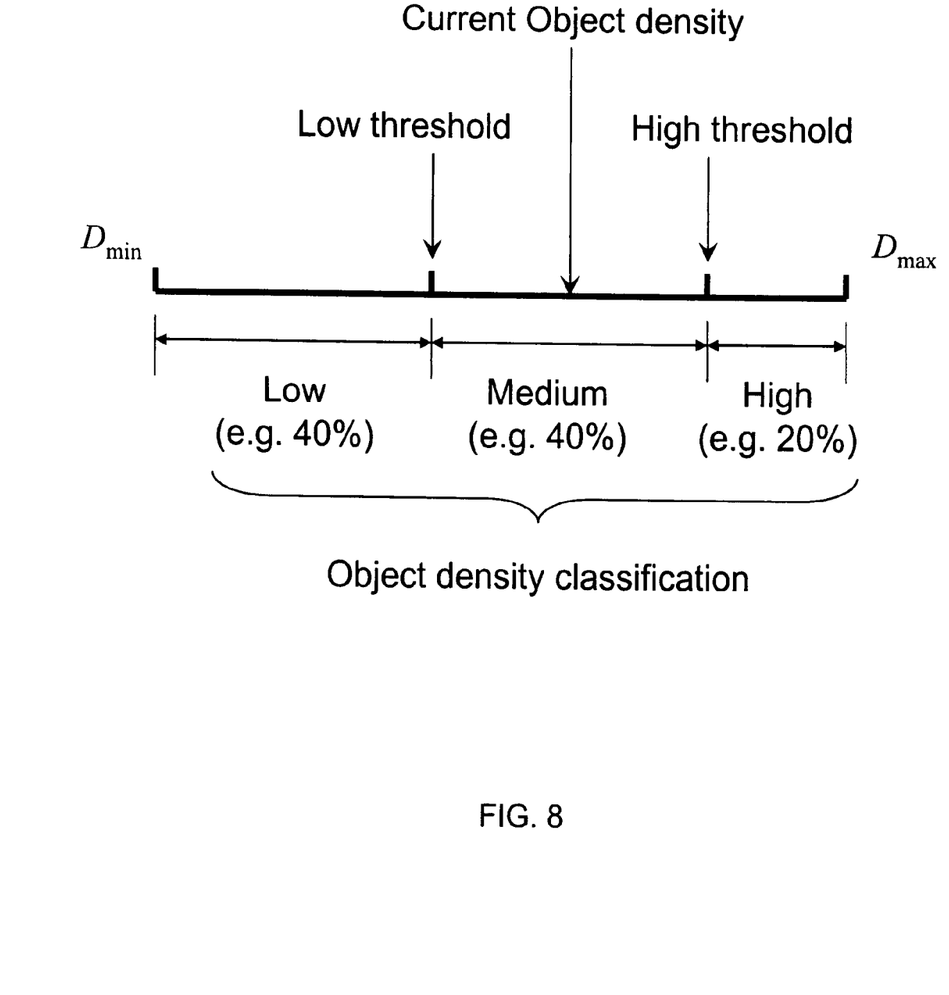
FIG. 8 illustrates the object density threshold adjustment and classification according to an exemplary embodiment of the invention.

Object density may be classified into categories based on adaptive thresholds (block 405). The adaptive thresholds help the system learn the specifics of the scene, and categorize accordingly. In an exemplary subway station monitoring application, not all stations have the same amount of traffic, so what may be considered as only medium density at one station, may be high density at another. The adaptive thresholds allow the system to automatically learn this. FIG. 8 illustrates an exemplary embodiment of object density threshold adjustment and classification process of block 403 of FIG. 4. Once the dynamic range of object density is calculated (in FIG. 7), it could be used to label different values in different classes. As an example in this exemplary embodiment, the object density is divided into three classes—low, medium, and high. The low class include the lowest 40% of the object densities, the high class includes the top 20% of object densities, and the middle class includes the middle 40% of the object densities. The current object density is then compared to the low and high thresholds shown in FIG. 8 and a label is assigned to it accordingly. The Dmin and Dmax thresholds represent the extremes, always bounding the low and high thresholds.

The object density can be used in any way to fit various applications. Alerts may be triggered when the density of interest is reached, or stops being true. A duration may be defined so that an alert is generated only if a certain density is maintained for a prescribed period of time, thus eliminating being affected by a sudden density spike such as people getting off the train, or cars stopped and backing up at a long red light.

Figure 9:
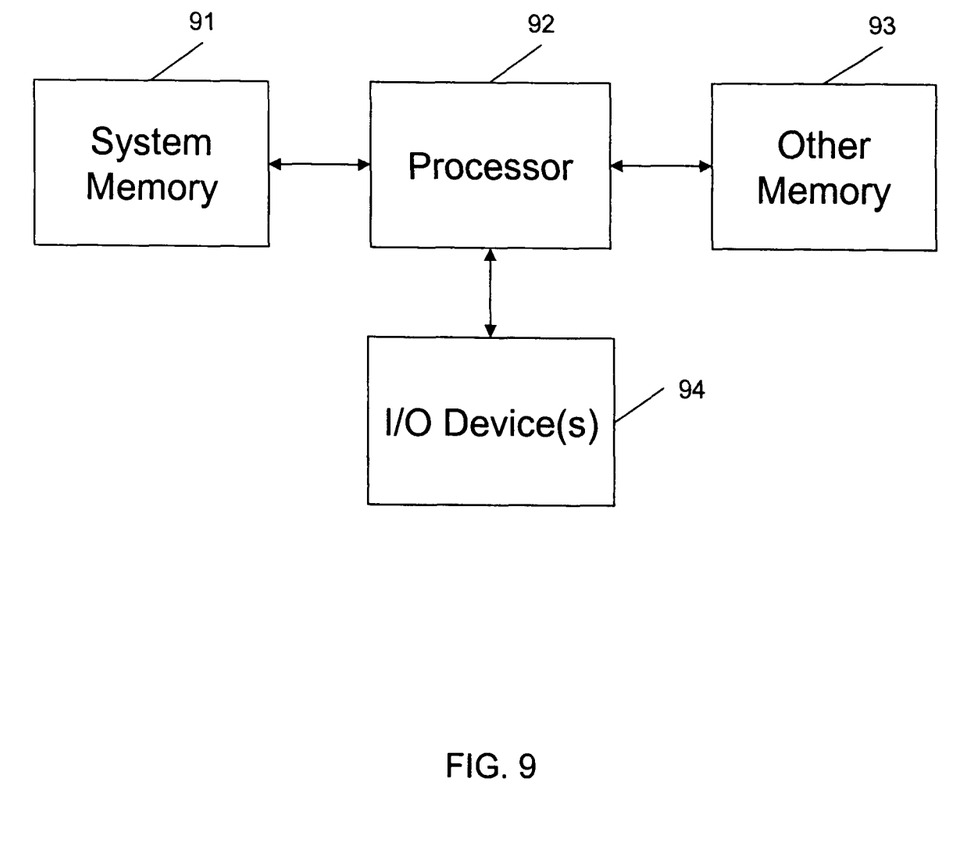
FIG. 9 illustrates a block diagram of an exemplary system that may be used in implementing some embodiments of the invention.

Some embodiments of the invention, as discussed above, may be embodied in the form of software instructions on a machine-readable medium. Such an embodiment is illustrated in FIG. 9. The computer system of FIG. 9 may include at least one processor 92, with associated system memory 91, which may store, for example, operating system software and the like. The system may further include additional memory 93, which may, for example, include software instructions to perform various applications. The system may also include one or more input/output (I/O) devices 94, for example (but not limited to), keyboard, mouse, trackball, printer, display, network connection, etc. The present invention may be embodied as software instructions that may be stored in system memory 91 or in additional memory 93. Such software instructions may also be stored in removable or remote media (for example, but not limited to, compact disks, floppy disks, etc.), which may be read through an I/O device 94 (for example, but not limited to, a floppy disk drive). Furthermore, the software instructions may also be transmitted to the computer system via an I/O device 94, for example, a network connection; in such a case, a signal containing the software instructions may be considered to be a machine-readable medium.

What is claimed is:

1. A non-transitory computer-readable medium comprising software for video surveillance, which when executed by a computer system, causes the computer system to perform operations comprising:
   receiving video from a video camera;
   detecting features in the video;
   accumulating feature strength for each pixel in a window, wherein the feature strength is proportional to a number of times a feature is present over time;
   classifying those pixels whose accumulated feature strength over time is larger than a threshold as background features;
   comparing the background features to extracted features to determine foreground features, the foreground features corresponding to those features not classified as the background features;
   estimating object count based on the foreground features detected;
   computing a current object density based on the object count;
   determining a current range of object densities by adjusting a maximum object density and a minimum object density, wherein adjusting the maximum object density and the minimum object density comprises:
      subtracting a recovery density from the maximum object density if the maximum object density is greater than a first normal value; and
      adding the recovery density to the minimum object density if the minimum object density is less than a second normal value;

replacing the minimum object density with the current object density if the current object density is less than the minimum object density;

replacing the maximum object density with the current object density if the current object density is greater than the maximum object density;

dynamically adjusting one or more object density thresholds based on the determined current range of object densities;

dividing the determined current range of object densities into a plurality of classes based on the one or more object density thresholds;

classifying the current object density based on the one or more dynamically adjusted object density thresholds; and generating an alert based on determining that a classification of the current object density is associated with the alert.

2. The computer-readable medium of claim 1, wherein the detecting features comprises:

removing background features from the extracted features.

3. The computer-readable medium of claim 1, wherein the operations further comprise sub-sampling the foreground features into a lower resolution than a current resolution.

4. The computer readable medium of claim 1, wherein the threshold is computed by determining a difference between a maximum and a minimum feature strength and the threshold is a multiple of the difference plus the minimum feature strength.

5. The computer-readable medium of claim 1, wherein the estimating object count comprises weighting the object count at different locations to correct for a perspective of the video camera.

6. The computer-readable medium of claim 1, wherein computing the current object density comprises:

defining an area of interest in the video; and dividing the object count over the area of interest.

7. The computer-readable medium of claim 1, wherein computing the current object density further comprises correcting areas from the current object density calculation that have a density close to zero for a predetermined time.

8. The computer-readable medium of claim 1, wherein dynamically adjusting the one or more object density thresholds further comprises:

adjusting the one or more object density thresholds based on at least one of the maximum object density and the minimum object density before the adjusting the maximum object density and the minimum object density.

9. An apparatus to perform video surveillance, comprising:

at least one video camera; and a video surveillance system coupled to the at least one video camera and comprising:

a processing system comprising one or more processors; and a memory system comprising one or more computer-readable media, wherein the one or more computer-readable media contain instructions that when executed by the processing system, cause the processing system to perform operations comprising:

accumulating feature strength for each pixel in a window from a video, wherein the feature strength is proportional to a number of times a feature is present over time;

classifying those pixels whose accumulated feature strength over time is larger than a threshold as background features;

comparing the background features to extracted features to determine foreground features, the foreground features corresponding to those features not classified as the background features; and estimating object count based on the foreground features detected;

computing a current object density based on the object count;

determining a current range of object densities by adjusting a maximum object density and a minimum object density, wherein adjusting the maximum object density and the minimum object density comprises:

subtracting a recovery density from the maximum object density if the maximum object density is greater than a first normal value; and adding the recovery density to the minimum object density if the minimum object density is less than a second normal value;

replacing the minimum object density with the current object density if the current object density is less than the minimum object density;

replacing the maximum object density with the current object density if the current object density is greater than the maximum object density;

dynamically adjusting one or more object density thresholds based on the determined current range of object densities;

dividing the determined current range of object densities into a plurality of classes based on the one or more object density thresholds;

classifying the current object density based on the one or more dynamically adjusted object density thresholds; and generating an alert based on determining that a classification of the current object density is associated with the alert.

10. The apparatus according to claim 9, wherein the video surveillance system further comprises:

a pre-defined rules database.

11. The apparatus according to claim 9, the operations further comprising:

removing background features from the extracted features.

12. The apparatus according to claim 9, the operations further comprising:

sub-sampling the foreground features into a lower resolution than a current resolution.

13. The apparatus according to claim 9, the operations further comprising determining a difference between consecutive snapshots from the video.

14. The apparatus according to claim 9, the operations further comprising weighting the object count at different locations to correct for a perspective of the video camera.

15. The apparatus according to claim 9, the operations further comprising:

defining an area of interest in the video; and dividing the object count over the area of interest.

16. The apparatus according to claim 9, the operations further comprising correcting areas from the current object density calculation that have a density close to zero for a predetermined time.

17. The apparatus according to claim 9, the operations further comprising:

adjusting the one or more object density thresholds based on at least one of the maximum object density and the minimum object density before the adjusting the maximum object density and the minimum object density.

18. The computer readable medium of claim 1, wherein the method performed further comprises:
  generating an alert if the current object density is above or below a predetermined level for a prescribed period of time.

19. The apparatus of claim 9, the operations further comprising monitoring a moving direction of objects.

\* \* \* \* \*